June 24, 1969   C. GOODACRE   3,451,656
INDUSTRIAL LIFT TRUCKS

Filed Nov. 21, 1967

United States Patent Office 3,451,656
Patented June 24, 1969

3,451,656
INDUSTRIAL LIFT TRUCKS
Cecil Goodacre, Basingstoke, England, assignor to Lansing Bagnall Limited, Basingstoke, England, a British company
Filed Nov. 21, 1967, Ser. No. 684,709
Claims priority, application Great Britain, Nov. 23, 1966, 52,509/66
Int. Cl. B60p 1/48; B25j 3/00
U.S. Cl. 254—8                    4 Claims

ABSTRACT OF THE DISCLOSURE

An industrial self-propelled wheeled lift truck is provided with a load-carrying lift-platform comprising a lower part carried by support wheels an upper part mounted on the lower part and a bearing between the parts to allow relative rotation therebetween about a vertical axis, the arrangement being such that the truck may be used to transport a flat load carried on the upper part of the lift platform and may also be driven to rotate about the vertical axis of the lift platform whilst the load remains stationary. Preferably two trucks are used together to lift and manoeuvre a single load container.

---

This invention relates to industrial lift trucks.

According to the invention an industrial self-propelled wheeled lift truck comprises a body portion with one or more steerable wheels at least one of which has a driving motor, a load-carrying lift platform extending from the body portion and having support wheels, means for raising and lowering the lift platform relatively to the body portion and to the support wheels therefor, which platform comprises a lower part carried by the support wheels, an upper part mounted on said lower part with a load-carrying surface above the level of the support wheels, and a bearing between said parts to allow relative rotation therebetween about a vertical axis, the arrangement being such that the truck may be used to transport a flat load carried on the upper part of the lift platform and projecting therefrom and the truck may also be driven to rotate about the said vertical axis of the lift platform with a projecting stationary load supported on the upper part of said platform.

Preferably the lift platform comprises a two-part horizontal ring, the said bearing (e.g. an annular ball bearing) being mounted between the upper and lower parts of the ring.

It is also preferred that the means for raising and lowering the lift platform (e.g. one or more hydraulic jacks) act on said lower part of the lift platform.

The lift platform is preferably supported by a pair of load wheels which are mounted on either side of the said vertical axis of the lift platform and are spaced inwardly of the edges of the lift platform.

A pair of drive wheels are preferably mounted under the said body portion of the truck, means being provided for steering said drive wheels.

The or each said drive wheel and/or the or each said support wheel for the lift platform is preferably mounted on one end of a rocker arm, the other end of said rocker arm carrying a castor wheel.

Releasable fastening means are preferably provided between the upper and lower parts of the lift platform, which means are capable of precluding relative movement therebetween.

An advantage of the truck described above is that it may comprise one of a pair of said trucks that are capable of manoeuvreing a load container extending between the lift platforms of the two trucks, the body portion and the lower part of the lift platform of each truck being rotatable about the vertical axis of the respective lift platform and relatively to the respective upper part of the lift platform without substantial lateral movement of the container.

By way of example, a specific embodiment in accordance with the invention will now be described with reference to the accompanying diagrammatic drawings in which.

Figures 1, 2:
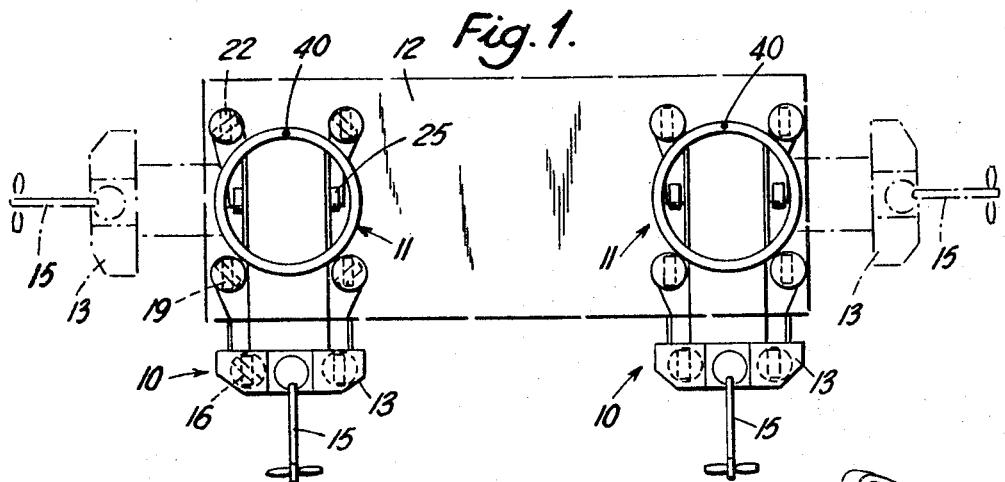
FIGURE 1 is a plan view of two industrial lift trucks, each truck having a lift platform located under a single load container to be lifted and manoeuvred, and each truck being shown in two positions between which the truck may be moved without substantial lateral movement of the container.
FIGURE 2 is a perspective view of one of the trucks shown in FIGURE 1, the raised portion of the lift platform of the truck being shown in chain-lines.

The subject-matter of this example relates to the manoeuvreing of large freight containers, e.g. within the hold or on the deck of a ship. These containers may be 20 ft. x 8 ft. x 8 ft., and may weigh 20 tons. Cranes are able to deposit the containers onto dunnage but accurate positioning of the heavy freight containers, e.g. in rows close together, is either difficult or, within the hold of a ship, may be impossible by means of the cranes only. On the other hand the necessary manoeuvres to position the containers can readily be carried out by using two of the lift trucks described below and shown in the drawings.

With reference to FIGURE 1, each of two lift trucks 10 is provided with a body portion 13 having a lift platform 11 extending therefrom, which lift platform is located underneath one end of a load container 12 when deposited on dunnage (not shown). A part of the lift platform can then be rotated with respect to the container but in fixed relation to the body portion 13 of the truck, for example, by moving the truck from its full-line position to its chain-line position. The trucks can then be employed to move the container along a different path, hydraulic jacks 21 (see FIGURE 2) being provided to raise the lift platform 11 with respect to the body portion 13 of the truck, off the dunnage.

Figure 3:
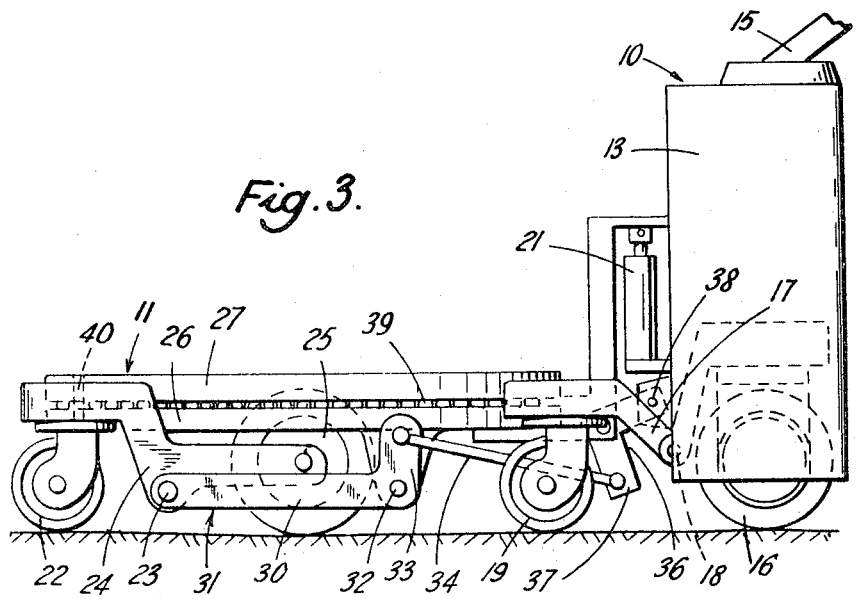
FIGURE 3 is a side view of the linkage between the lift platform and the wheels of the truck shown in FIGURE 2, the lift platform being in its lowered position.
Figure 4:
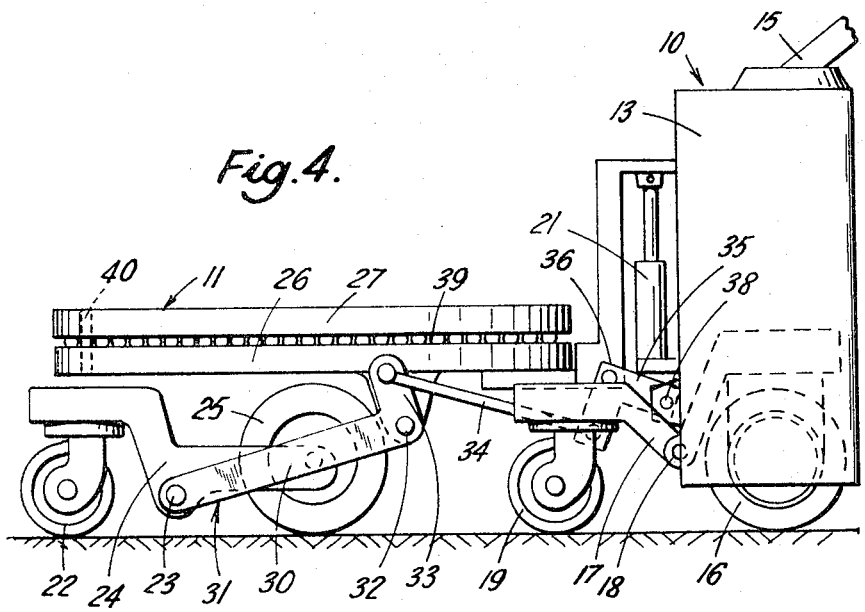
FIGURE 4 is a similar view as shown in FIGURE 3 with the lift platform in its raised position.

Turning to FIGURES 2 to 4, the construction of one of the trucks, the other one being identical, is shown in more detail. The truck is basically an electrically-powered stillage truck and is controlled by means of a steering arm 15 mounted on the body portion 13 of the truck. Below the body portion 13 there are two drive wheels 16 each of which is driven by an electric motor 41 mounted within its hub. A power-assisted steering mechanism (not shown) is provided between the steering arm 15 and the drive wheels 16 which mechanism may include a linkage of the kind described in the specifications of our U.S. Patents Nos. 3,181,640 and 3,059,944.

Each wheel 16 is also mounted at one end of a rocker arm 17 pivoted at 18 to the body portion of the truck, the other end of the rocker arm carrying a castor wheel 19.

Projecting forwardly from the body portion 13 there is the lift platform 11 which is movable between lowered and raised positions by an hydraulic jack or, in this example, a pair of hydraulic jacks 21. Underneath the lift platform, there are two load wheels 25, which wheels are mounted on further rocker arms 24 pivoted at 23, the arms 24 carrying at their other ends castor wheels 22. The load wheels 25 are located inwardly of the castor wheels 22, whereby the load of the container is more evenly distributed.

The lift platform 11 comprises a horizontal two-part ring 26, 27, the part 27 being located on top of the part 26 and being spaced therefrom by a horizontally mounted annular ball bearing 39 (see FIGURES 3 and 4), whereby the part 27 is rotatable relatively to the part 26 and the remainder of the truck in either direction about a vertical axis. On the other hand, the two parts of the platform are raised or lowered by the jacks 21 as a unit.

The load wheels 25 are spaced apart on either side of the said vertical axis of the lift platform. Also, each wheel 16, 19, 22 is mounted so that it is capable of following a circular path about the vertical axis of the lift platform, when on full lock, proper tracking of the truck, during its rotary movement, thereby being obtained. With regard to the left-hand truck of FIGURE 1, the full-lock position of each wheel 16, 19, 22 is shown in chain-lines.

It will be appreciated that the two-part ring 26, 27 of the lift platform 11 is raised and lowered in the same manner as the lift platform or forks of known constructions of stillage or pallet trucks. Also, the castor wheel 22 and load wheel 25 on each side of the truck may be considered to be equivalent to the trail wheels of the truck described and claimed in the specification of our U.S. patent application No. 549,573, i.e. the wheels 22, 25 are caused to rise or fall together when the ring lift platform is lowered or raised respectively, and the wheels 22, 25 on one side of the truck are caused to rise or fall independently of the lift platform when the wheels 22, 25 on the other side of the truck fall or rise respectively (e.g. on uneven ground). The linkage provided for effecting such operation of the wheels 22, 25 is also substantially the same as that described in the aforesaid specification except that it is to be appreciated that in the truck of this example the wheels 22, 25 are specially positioned to produce a more even distribution of the container weight. This linkage need not therefore be described in detail. However, with reference to FIGURES 3 and 4, it will be seen that each rocker arm 24 is pivotally mounted on one leg 30 of a crank lever 31, which lever 31 is pivotally mounted at 32 to the lower part 26 of the ring lift platform. The other leg 33 of the lever 31 is pivotally connected to a rod 34 extending towards the body portion of the truck and being connected to one leg 35 of a crank lever 36 which is raised or lowered in fixed relation with the lift platform 11, the other arm 37 of the crank lever being pivotally mounted to the body portion at 38. The linkages are also connected to each other by the same means as described in the aforesaid specification whereby up and down movement of the wheels 22, 25 which movement is independent of the lift platform, may be effected.

Releasable fastening means are also provided for temporarily locking together the two parts 26, 27 of the ring lift platform 11, which means, in this example, comprise a pin 40 which passes through a hole in the top part 27 into an aligned hole in the bottom part 26. The truck may then be used on its own, for example, to lift a container of smaller size. On insertion of the pin 40, the body portion of the truck is, of course, not relatively rotatable with respect to the upper part 27 of the lift platform.

The use of the truck is, of especial advantage when it is used with another identical truck, the two trucks being entered beneath opposite ends of a container and then lifting the container off its dunnage, the major portion of the weight of the container being taken by the load wheels. The container may then be moved backwards or forwards along a path and subsequently moved backwards or forwards along any other path, the trucks having been rotated relatively to the container and the upper parts 27 of the lift platforms rotated about the vertical axis of their respective ring lift platforms 11. By means of the two trucks, the operators are able to manoeuvre the container into a confined space, the rotating movements of the trucks relative to the container and the upper parts 27 of the lift platforms being effected without substantial lateral movement of the container.

I claim:

1. An industrial self-propelled wheeled lift truck comprising a body portion with at least one steerable wheel having a driving motor, a load-carrying lift platform extending from the body portion and having a pair of nonsteerable support wheels, means for raising and lowering the lift platform relatively to the body portion of the truck and to the support wheels for the lift platform, the lift platform comprising a lower part carried by the support wheels, an upper part mounted on said lower part with a load-carrying surface above the level of the support wheels and a bearing between said parts to allow free relative rotation between the said upper and lower parts above a vertical axis, and the support wheels for the lift platform being spaced apart on an axis which intersects the said vertical axis of rotation of the said upper and lower parts of the lift platform, and a plurality of castor wheels spaced around the said vertical axis, which castor wheels comprise further support wheels for the lower part of the lift platform.

2. A truck as claimed in claim 1 in which there are at least three said castor wheels, each of two of the castor wheels being mounted on one end of a rocker arm, the other end of the respective rocker arm carrying one of the said non-steerable support wheels for the lift platform and the third castor wheel being mounted on one end of a further rocker arm, the other end of the further rocker arm carrying the said steerable wheel beneath the body portion of the truck.

3. A truck as claimed in claim 1 in which releasable fastening means are provided between the upper and lower parts of the lift platform, which means are capable of precluding relative movement therebetween.

4. A pair of trucks, each truck including the limitations as set forth in claim 1, which trucks are capable of being used in combination to manoeuvre a single load container extending between the lift platforms of the two trucks, the body portion and the lower part of the lift platform of each truck being rotatable about the vertical axis of the respective lift platform and relatively to the respective upper part of the lift platform without substantial lateral movement of the container.

References Cited

UNITED STATES PATENTS

| | | | |
|---|---|---|---|
| 2,369,838 | 2/1945 | Minnis | 254—2 |
| 2,613,822 | 10/1952 | Stanley | 214—1 |

ALBERT J. MAKAY, *Primary Examiner.*

U.S. Cl. X.R.

214—1, 512